United States Patent Office 2,703,316
Patented Mar. 1, 1955

2,703,316

POLYMERS OF HIGH MELTING LACTIDE

Allan K. Schneider, Wilmington, Del., assignor to E. I. du Pont de Nemours & Company, Wilmington, Del., a corporation of Delaware No Drawing. Application June 5, 1951, Serial No. 230,079

7 Claims. (Cl. 260—78.3)

This invention relates to polymeric materials and, more particularly, to lactide polymers possessing improved properties and to a process for preparing them.

Polymers of lactic acid are produced by self-esterification with elimination of water. One of the simplest of these is lactide, a cyclic dimer formed by heating lactic acid under reduced pressure to distill off water resulting from the condensation reaction. Higher polymers, conveniently designated polylactides because the empirical formula is substantially the same as that of lactide, have been formed by heating in the range from 250° C. up to temperatures producing considerable decomposition. In this way polymers have been formed which are useful in coating compositions and as modifying agents for cellulose derivatives. These previously known polymers are low melting and/or brittle, cannot be oriented by drawing, and are quite unsuitable for use in the manufacture of fibers, filaments, or self-supporting films.

It is an object of this invention to produce polylactides which are suitable for forming tough self-supporting thin films, fibers, and the like, which are orientable by drawing. Another object is to provide tough self-supporting films of polylactide. Another object is to provide oriented thin films of polylactide which are suitable for use as wrapping tissue. Another object is to provide such lactide polymers which have been modified by being copolymerized with another polymerizable cyclic ester. A further object is to provide a process for producing such lactide polymers, including both homopolymers and copolymers. Other objects will become apparent from the following description and the appended claims.

The objects of the invention are accomplished, in general, by heating highly purified lactide having a melting point of more than 120° C. to a temperature above the melting point and below 200° C. in the presence of a polyvalent metal oxide, added as such or as a salt of a polyvalent metal which is thermally converted to the oxide at the temperature of polymerization. The lactide polymers produced, both homopolymers and copolymers with up to 50% of another polymerizable cyclic ester having a 6- to 8-membered ring, e. g., glycolide or a substituted glycolide, form strong fibers and films which are orientable by drawing.

The melting point of the lactide starting material is determined by the usual method in which particles are placed in a capillary tube and observed as the temperature is slowly raised. By the term "orientable" as used herein is meant that a self-supporting film of the polymer is capable of being drawn at temperatures between 25° and 75° C. into an elongated film showing, by X-ray diffraction, orientation along the axis of elongation.

The lactide homopolymers produced by the process of this invention are clear, colorless and capable of being oriented by drawing. They exhibit inherent viscosities (the natural logarithm of the relative viscosity of 0.1% solution in benzene at 25° C., divided by 0.1) of at least 0.45. These homopolymers are soluble at room temperature in acetone and in benzene, and are insoluble in water or in ethanol.

The homopolymers have "tack" points of from 60° C. up to 130° C. depending upon the conditions of polymerization. By "tack" point is meant a softening temperature determined by repeatedly drawing a piece of the polymer across the face of a brass block, as the temperature of the block is a slowly raised, and noting the temperature at which the polymer first softens sufficiently for a portion to adhere to the block and pull away from the rest of the polymer. A "tack" point below 60° C. indicates that the polylactide has not been polymerized sufficiently to form useful self-supporting films or fibers. Within the range of 60° to 130° C., the polymers having "tack" points above 80° C. are preferred for forming films to be used as wrapping tissues, while polymers having lower "tack" points are generally rubbery in nature.

Films cast from solution or pressed from the polymer at elevated temperature exhibit the following characteristics: tensile strength 900 to 2000 lb./sq. in. with elongations of 200 to 400%; and substantially the same wet tensile strength (after immersion in water for 2 hours at 25° C.). Oriented films, obtained by cold or hot drawing to an extent of 400 to 500% solvent-cast or hot-pressed films, exhibits tensile strengths of 20,000 to 30,000 lb./sq. in. with elongations of 30 to 60%; wet tensile strengths of 20,000 to 25,000 lb./sq. in. with elongations of 30 to 40%; and cold crack values (measured as the highest temperature at which cracking or snapping occurs when the film is sharply creased while immersed in a nonsolvent cooling liquid) of less than −50° C. X-ray diffraction diagrams of homopolymer films cast from solvents and dried at room temperature indicate that such films are amorphous in character, whereas similar films, solvent cast but baked at 70° C., and hot pressed films exhibit X-ray diffraction patterns indicating crystalline character. On the other hand, drawn films, both solvent cast and hot pressed, give X-ray diffraction patterns showing definite orientation.

A preferred way of carrying out the process of this invention consists in heating purified lactide having a melting point of more than 120° C., alone or in admixture with another polymerizable cyclic ester having 6 to 8 atoms in the ring, e. g., glycolide or tetramethyl glycolide, at a temperature of 140 to 180° C. in a closed evacuated vessel in the presence of 0.02% to 0.1%, based on the weight of the monomeric material present, of a polyvalent heavy metal oxide, or salts of such metals capable of being thermally converted to the oxide under the polymerization conditions, e. g., litharge, lead stearate, antimony oxide and zinc borate.

The polymerization process can be carried out at any temperature between the melting point of the lactide and 200° C. The use of temperatures below 120° C., for example, obtained by heating a solution of the lactide in a solvent such as benzene or xylene, causes polymerization of the lactide but the resulting polymer has a low inherent viscosity, and is not capable of being oriented. Increasing the temperature within the range of 120° to 200° generally increases the speed of polymerization. Temperatures above 200° C. are not desirable because of the tendency of the polymer to be degraded to the monomer. The monomer-polymer equilibrium does not favor high polymers above 200° C. Best results are obtained with temperatures of 140° to 180° C.

In preparing orientable lactide homopolymers it is preferable to carry out the reaction in a closed, evacuated reaction vessel. However, orientable copolymers can be obtained by carrying out the polymerization at atmospheric pressure with the polymerization system blanketed by an inert gas such as, for example, nitrogen.

It is quite essential, in order to obtain orientable homopolymers of lactide, having inherent viscosities of 0.45 or higher, to use highly purified lactide having a capillary tube melting point of at least 120° C. Lactides having a melting point of 123 to 125° C. are preferred since they give polymers having the most desirable properties. When lactides having a melting point of 118° C. are polymerized by a process identical to that used with higher melting lactides, the products are brittle polymers having inherent viscosities of less than 0.4, and "tack" points of less than 60° C. A suitable method for preparing lactide having the necessary purity is described below.

Commercial lactic acid, containing 50% to 20% water, is concentrated by distillation at atmospheric pressure and at 120 to 130° C. to remove approximately all the water of dilution. The concentrated acid is then distilled under reduced pressure, e. g., 17 to 35 mm. of mercury, removing water of esterification and producing a low molecular weight, syrupy polylactic acid. The pressure in the distillation system is further reduced to 8 to 10 mm. of mercury and the temperature of the mixture increased to 200° to 250° C. Under these conditions the low molecular weight polylactic acid is converted to the isomeric dimer, lactide, which distills at 130° to 140° C. at 10 to 13 mm. of mercury. The crude lactide obtained in this way is a soft crystalline solid and often has an optical rotation in benzene solution. The optical activity of this product is caused by the presence in the commercial lactic acid of a slight excess of one of the optical isomers of lactic acid.

This crude lactide may be purified by repeated crystallization from ethyl acetate. By this procedure the optical activity is found to decrease until after three recrystallizations the product exhibits no optical activity, thus indicating a separation of the excess of one optical isomer originally present. After each successive crystallization, the fraction concentrated is found to be less soluble in ethyl acetate, or other solvents, than the initial crude lactide. The melting point of the lactide also increases after each recrystallization. The melting points of the different recrystallized products obtained as above are as follows:

| Recrystallization | Melting Point, ° C. |
|---|---|
| 1 | 114–115 |
| 2 | 118 |
| 3 | 123–124 |
| 4 | 124–125 |

Lactide having a melting point of 120° C. or higher is suitable for preparing orientable polymers. Lactide having a melting point below 120° C. is not suitable for this purpose.

The invention is further illustrated by the following examples in which proportions of ingredients are expressed in parts by weight unless otherwise noted.

*Example I*

A mixture of 3.0 parts of lactide having a melting point of 124–125° C. and 0.0012 part of lead monoxide (litharge) is placed in a glass tube, the tube evacuated and then sealed. The reaction tube is placed in an oven maintained at 140° C. and the viscosity behaviour of the reaction mixture is observed periodically. After 18 hours at 140° C. the mixture is a clear, thick syrup. After 92 hours the syrup has hardened to a crystal clear solid. On removal from the reaction tube, the polymer is found to be very tough, hard and non-shatterable under vigorous blows of a hammer. In fact, the glass tube shatters without effect on the polymer contained in it and it is necessary to file the glass particles away from the solid polymer. This polylactide is readily soluble in benzene and in acetone, and softens when heated. Self-supporting films cast from solutions of the polymer in these solvents are clear, rubbery and tough. Similar film is prepared by pressing the solid polymer in a hydraulic press whose platens are heated to temperatures above 85° C. The resulting pressed film can be cold drawn, with typical "necking down," this behaviour indicating the orientability of the polymer. The inherent viscosity of this polymer, measured at 0.10% concentration in benzene at 25° C., is 0.79.

*Example II*

A polymer is prepared in the same manner as in Example I using 50 parts of lactide having a melting point of 123–124° C. and 0.025 part of litharge, heating being continued at 140° C. for 111 hours. The product is a tough, light-colored polymer of lactide having an inherent viscosity of 0.51, measured at 0.1% concentration in benzene. An 18% solution of this polymer in benzene is readily formed at room temperature. This solution is colorless and is easily cast into a thin film. One portion of this film is dried at room temperature giving a transparent, soft, limp, elastic and very pliable film (film A). Another portion of the film is dried at 80–100° C. giving a transparent, colorless but stiff and brittle film (film B) which breaks when flexed. Film A is convertible to film B by heating at 70° C. or higher for 10 minutes, but it is not possible readily to reconvert it to the limp form. A portion of film B is drawn 500% at 50° C. giving a film (film C) which is no longer brittle nor stiff and is greatly increased in tensile strength. X-ray diffraction patterns indicate that film C is oriented. Physical properties of these three types of films are summarized in the following table.

| | Film A | Film B | Film C |
|---|---|---|---|
| "Tack" Point | 84° C. | 94° C. | |
| Thickness | 0.003 inch | | 0.0014 inch. |
| Cold crack | | Room Temp. | Less than −50° C. |
| Tensile strength at break (dry) | 2,170 lb./sq. in. | | 21,400 lb./sq. in. |
| Elongation at break (dry) | 310% | | 41%. |
| Tensile strength at break (wet) | 1,500 lb./sq. in. | | 21,000 lb./sq. in. |
| Elongation at break (wet) | 205% | | 40%. |
| Film structure, based on X-ray diffraction | Amorphous | Crystalline, non-oriented. | Crystalline, oriented. |
| Solubility in benzene | Soluble | Soluble | Soluble. |

*Example III*

Ten parts of highly purified lactide having a melting point of 125° C. is heated at 180° C. for a period of 6.5 hours in a closed evacuated reaction vessel with 0.004 part of litharge as catalyst. A clear colorless polymer having an inherent viscosity, measured at 1.0% concentration in benzene at 25° C., of 0.63, and having a "tack" point of 82° C. is obtained. This polymer can be formed into pressed films which are orientable on cold drawing.

*Example IV*

Ten parts of highly purified lactide having a melting point of 125° C., is heated at 145° C. for 64 hours in a closed evacuated reaction vessel with 0.004 part of litharge as catalyst. The resulting polymer is clear, colorless and tough. When pressed in a hydraulic press at a temperature of 155° C., the polylactide forms a clear tough film.

The critical part which the purity of the lactide monomer plays is demonstrated by repeating the procedure with less prefectly purified lactide (as described previously after being recrystallized from ethyl acetate only two times) which had a melting point of 118° C. There is produced a brittle polymer which cannot be formed into drawable films. The properties of the two polymers are as follows:

| | A | B |
|---|---|---|
| Melting point of lactide | 125° C. | 118° C. |
| Nature of polymer | Tough | Brittle. |
| "Tack" point of polymer | 124° C. | Less than 50° C. |
| Inherent viscosity of polymer (0.1% in benzene at 25° C.) | 1.21 | 0.15. |

The brittle polymer "B" may also be obtained by direct polymerization of lactic acid at temperatures below those causing decomposition to lactide, i. e., below 230–250° C.

*Example V*

A mixture of 5 parts of purified lactide having a melting point of 124–125° C., 5 parts of purified glycolide and 0.004 part of litharge is heated in a sealed, evacuated vessel for 64 hours at 145° C. The resulting lactide/glycolide copolymer is a light colored, tough solid which is insoluble in benzene. The polymer is hot pressed to a clear tough film having a "tack" point of 106° C. This pressed film can be cold drawn and the drawn film has great strength.

Example VI

A mixture of 12 parts of lactide having a melting point of 124–125° C., 2 parts of tetramethyl glycolide (prepared by the dehydration of α-hydroxyisobutyric acid), and 0.004 part of litharge is heated in a sealed, evacuated reaction vessel for 161 hours at 145° C. The resulting copolymer of lactide and tetramethyl glycolide is a light colored, low melting solid.

The examples have illustrated the polymers of this invention by describing orientable homopolymers of lactide and copolymers of lactide with glycolide and tetramethyl glycolide. However, this invention includes copolymers of lactide with up to 50% of any other polymerizable cyclic ester having a 6- to 8-membered ring. Specific examples of other cyclic esters of this type which are operable include sym-diethyl glycolide, diphenyl glycolide, the lactide from 2-hydroxy-4,6,6-trimethylheptanoic acid, delta-valerolactone, trimethylene carbonate, ethylene oxalate, propylene oxalate, and disalicylide.

The examples have illustrated the polymerization of lactide with particular reference to the use of litharge as the catalyst. However, other oxides of polyvalent metals, either added as such or as salts of these metals which are thermally converted to the oxide under the polymerization conditions, are operable. Specific examples of other such oxides and salts that are operable include lead stearate, basic lead carbonate, antimony trioxide, zinc oxide, zinc borate, cadmium oxide, titanyl stearate, magnesium oxide, calcium formate, and the like. The oxides and salts of heavy metals are preferred. Lead oxides and lead salts are especially suitable because of their high activity in producing lactide polymers of high inherent viscosity. These catalysts are used in concentrations of from 0.01% to 0.4%, and preferably 0.02% to 0.10%, of the weight of the monomers. Higher concentrations can be used but are less desirable since they cause more color in the polymer.

As a result of their ability to be oriented by drawing, the polymers of this invention are especially valuable in such applications as the manufacture of fibers and self-supporting films and for plastics. They are also useful in the manufacture of adhesives, safety glass, finishes, and in blends with other polymers for these purposes. Their ability to be oriented by drawing enables the development of high strength in the oriented polymer, and their good properties are retained at low temperatures and under conditions of high humidity or even on immersion in water. The properties possessed by the polymers of this invention are a marked improvement over the properties of hitherto known lactide polymers. For example a polylactide having an inherent viscosity of only 0.20 and which is dark and brittle is formed when lactide which has been recrystallized three times is heated in the presence of litharge for 16 hours at 215° C. This shows the critical nature of the 200° C. maximum temperature limit of this invention. Furthermore, the direct polymerization of lactic acid for 18 hours in the presence of zinc borate at 218° C. gives a very sticky, soft resin.

Since many different embodiments of the invention may be made without departing from the spirit and scope thereof, it is to be understood that the invention is not limited by the specific illustrations except to the extent defined in the following claims.

What is claimed is:

1. A process for producing lactide polymers capable of being formed into tough, orientable, self-supporting thin films which comprises heating lactide having a melting point of more than 120° C. to a temperature above the melting point and below 200° C. in the presence of 0.02% to 0.1%, based on the weight of monomeric material present, of a polyvalent metal oxide until a polymer having a "tack" point of 60° to 130° C. is formed.

2. A process for producing lactide polymers capable of being formed into tough, orientable, self-supporting thin films which comprises heating purified lactide having a melting point of more than 120° C. at a temperature of 140° to 180° C. under reduced pressure in the presence of 0.02% to 0.1%, based on the weight of monomeric material present, of a polyvalent heavy metal oxide until a thermoplastic polymer having an inherent viscosity of at least 0.45 is formed.

3. A process for producing an orientable copolymer of lactide which comprises heating a mixture of lactide having a melting point of more than 120° C. with up to 50% of another polymerizable cyclic ester having a 6- to 8-membered ring at a temperature above the melting point and below 200° C. in the presence of 0.02% to 0.1% based on the weight of monomeric material present of a polyvalent metal oxide until a copolymer having a "tack" point of at least 60° C. is formed.

4. A polylactide characterized by being tough, hard and capable of being formed into strong fibers and self-supporting films which are orientable by drawing at 25° to 75° C., said polylactide being formed by heating lactide having a melting point of more than 120° C. to a temperature above the melting point and below 200° C. in the presence of a polyvalent metal oxide.

5. An oriented, self-supporting thin polylactide film having a tensile strength of 20,000 to 30,000 pounds per square inch and cold crack values of less than −50° C., said polylactide being formed by heating lactide having a melting point of more than 120° C. to a temperature above the melting point and below 200° C. in the presence of a polyvalent metal oxide.

6. As a wrapping tissue, a tough, flexible and strong oriented thin film of polylactide having a "tack" point of 80° to 130° C., said polylactide being formed by heating lactide having a melting point of 123° to 125° C. to a temperature above the melting point and below 200° C. in the presence of a polyvalent metal oxide.

7. A self-supporting, pliable, thin polylactide film having an amorphous structure, said polylactide being formed by heating lactide having a melting point of more than 120° C. to a temperature above the melting point and below 200° C. in the presence of a polyvalent metal oxide.

References Cited in the file of this patent

UNITED STATES PATENTS

| Number | Name | Date |
|---|---|---|
| 1,995,970 | Durough | Mar. 26, 1935 |
| 2,555,385 | Watson | June 5, 1951 |

OTHER REFERENCES

Ind. and Eng. Chem. article by Watson, volume 40, Number 8, pages 1393–1397, Aug. 1, 1948.